April 10, 1928.

L. G. STRICKLAND 1,665,898

DRAFTING INSTRUMENT

Filed June 7, 1927

Inventor

L. G. Strickland

By Clarence A O'Brien

Attorney

Patented Apr. 10, 1928.

1,665,898

UNITED STATES PATENT OFFICE.

LOUIS G. STRICKLAND, OF HUNTINGTON, NEW YORK.

DRAFTING INSTRUMENT.

Application filed June 7, 1927. Serial No. 197,100.

My invention relates to drafting instruments and has for its object to provide a combined compass, straight-edge and protractor adapted particularly for determining the angles and measurements such as the measurement of inscribed angles, central angles, corresponding angles, or alternate interior angles of parallel lines, etc., and has for an object to provide an instrument of this character having its various elements arranged in simple and compact form, constructed as a unit with each of the elements arranged for separate and independent movement.

Other objects and advantages reside in the special construction, combination and arrangement of the various elements forming the invention as more fully hereinafter described and claimed, reference being had to the accompanying drawings forming part hereof, wherein:

Figure 1:
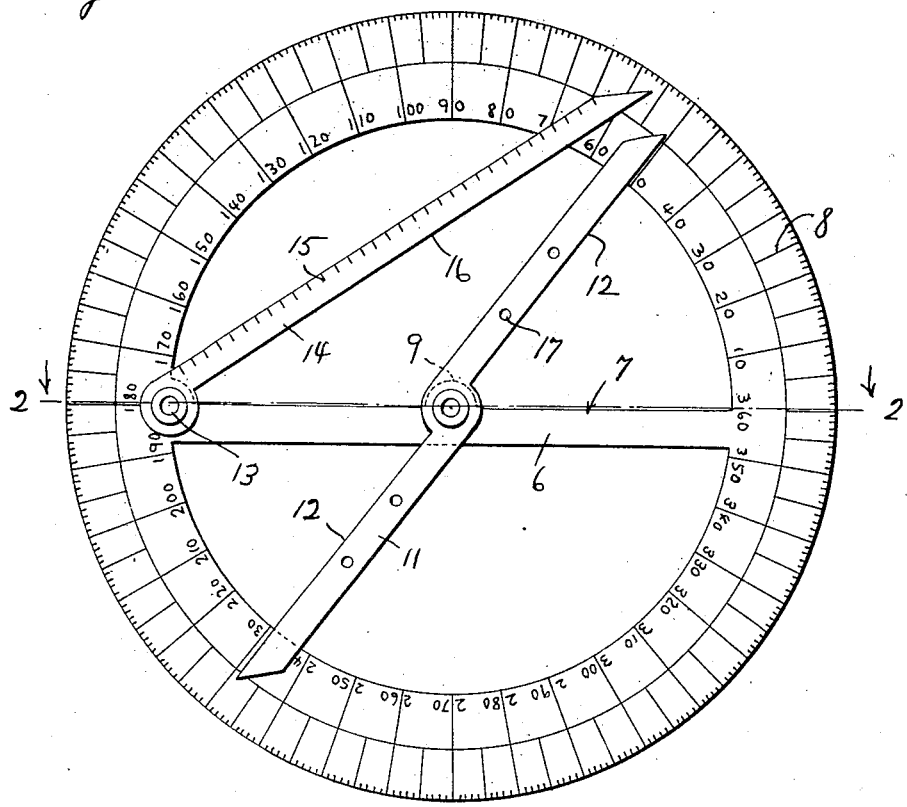
Figure 1 is a top plan view of the instrument.
Figure 2:
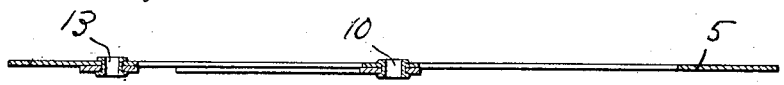
Figure 2 is a sectional view therethrough taken along the line 2—2 of Figure 1.

Referring now to the drawing I have shown my invention comprising a relatively thin flat ring indicated at 5 having a thin flat bar 6 extending diametrically between the inner edge of the ring and preferably formed integrally therewith. One edge of the bar 6 indicated at 7 is arranged as a centerline across the circle formed by the ring.

Upon the upper face of the ring is arranged a scale indicated at 8 dividing the area of the circle formed by the ring into degrees, the scale being graduated upwardly from the center line 7 at one side of the ring and arranged in counterclockwise order.

At the center of the bar is formed an offset indicated at 9 and shown by the dotted lines in Figure 1 of the drawing to provide means for centrally arranging a pivot pin 10 upon which a pair of diametrically oppositely extending arms 11 is rotatably mounted. The arms being integrally formed with each other. The arms are arranged in off-set alinement with one edge 12 of each arm being centrally alined with the center of the pivot pin and with each other, the ends of each arm being arranged to extend partly across the upper face of the ring 5.

At the juncture of one end of the bar 6 with the inner periphery of the ring 5 is arranged a pivot pin 13 upon which is rotatably carried a compass arm 14, one edge of said arm being provided with scale marks denoting inches and fractions thereof. The length of the arm 14 is substantially equal to the length of the bar 6. The opposite edge of the arm 16 is in radial alinement with the center of the pivot pin 13 on which the arm is mounted.

Apertures 17 are arranged along each of the central arms 11 at predetermined positions whereby the point of a pencil may be inserted therethrough when such arms are used as a compass.

It is obvious that the invention is susceptible to various changes and modifications without departing from the spirit thereof or the scope of the appended claims and I accordingly claim all such forms of the device to which I am entitled.

I claim:

1. In a device of the class described, a ring, a bar formed integrally therewith and extending across the center of the ring with one edge of the bar forming a center line therethrough, an arm pivotally mounted at the center of the bar and having one edge thereof forming a center line across the ring and an arm having one end pivotally mounted at the junction of one end of the bar with the ring, one edge of said arm forming a center line through said pivotal connection.

2. In a device of the class described, a ring having one face thereof marked into degrees graduated in counter-clockwise arrangement, a bar extending across the center of the ring and formed integrally therewith with one edge of said bar forming a center line through the ring, a pivot pin arranged at the center of the bar, a pair of integrally formed arms pivotally carried on said pin and extending to opposite sides of the ring with one edge of said arms forming a center line thereacross, a pivot pin arranged at the junction of one side of the bar and the ring and an arm pivotally carried thereon with one edge thereof forming a center line through said pivot pin.

In testimony whereof I affix my signature.

LOUIS G. STRICKLAND.